July 21, 1953 C. E. BEAVER 2,646,132
ELECTRICAL PRECIPITATOR FOR GAS SEPARATION
Filed Jan. 9, 1951 3 Sheets-Sheet 1

INVENTOR
CHARLES E. BEAVER

BY *Stowell & Evans*
ATTORNEYS

INVENTOR
CHARLES E. BEAVER

BY Stowell & Evans
ATTORNEYS.

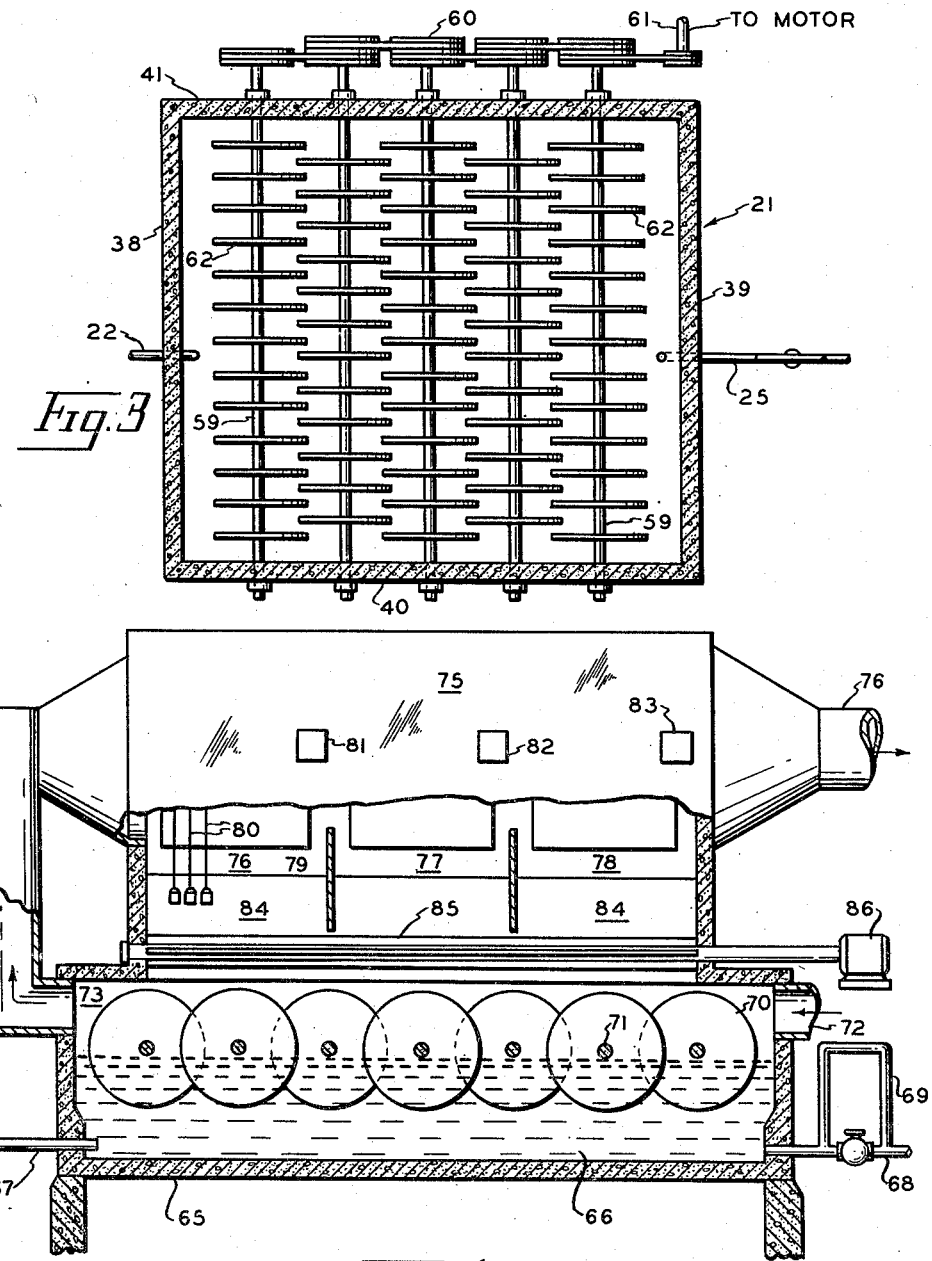

Patented July 21, 1953

2,646,132

UNITED STATES PATENT OFFICE 2,646,132

ELECTRICAL PRECIPITATOR FOR GAS SEPARATION

Charles E. Beaver, Bound Brook, N. J., assignor to Research Corporation, New York, N. Y., a corporation of New York Application January 9, 1951, Serial No. 205,131

5 Claims. (Cl. 183—7)

This invention relates to the recovery of dusts from gases containing the same and more particularly to the recovery of dust from the flue gases from a furnace burning black liquor in a sulfate process paper mill.

An object of the invention is to provide a method and apparatus for conveniently and economically collecting such dusts from a stream of hot gases containing the same in the form of a concentrated liquid solution of the dust.

Another object is to provide a method and apparatus for removing suspended material from furnace gases that are exhausted to the atmosphere whereby the nuisance of heavy smoke is abated and valuable materials are recovered from the gases for reuse.

Another object is to provide a method and apparatus for efficiently utilizing some of the heat normally lost in the furnace gases exhausted to the atmosphere.

The foregoing and other objects and advantages as will appear hereinafter are achieved in an electrical precipitator including a casing, complementary collecting and high tension electrodes in the casing, sump means adapted to contain a pool of liquid positioned beneath the complementary electrodes, liquid inlet and outlet means communicating with the sump means, means for removing precipitated material from the electrodes, means conducting the material removed from the electrodes into the sump means, a member providing an extended evaporating surface, means for moving the member to alternately immerse surface elements thereof in a pool of liquid in the sump means and expose the surface elements to the atmosphere superjacent to the pool, and means directing a stream of hot gases to be cleaned into contact with the member above the surface of the pool of liquid and between the complementary electrodes.

In its method aspect, liquid-soluble dusts are recovered from a stream of hot gases in which the dust is suspended by passing the stream of gases through a confined zone and electrically precipitating dust from the stream in the zone, establishing a pool of liquid solvent for the dust, transferring precipitated dust from the zone to the pool of liquid wherein the dust is dissolved, passing the stream of hot gases across the surface of the pool, and exposing portions of the pool of liquid in extended surface film form to the stream of hot gases passing across the surface of the pool, whereby the concentration of dust in the pool is increased both by addition of dust thereto and evaporation of liquid therefrom.

The invention will be described in detail with reference to the drawings in which:

Fig. 3 is a horizontal sectional view taken along the line 3—3 of Fig. 2; and

Fig. 4 is an elevational view with parts broken away of another form of electrical precipitator in accordance with the invention.

Figure 1:
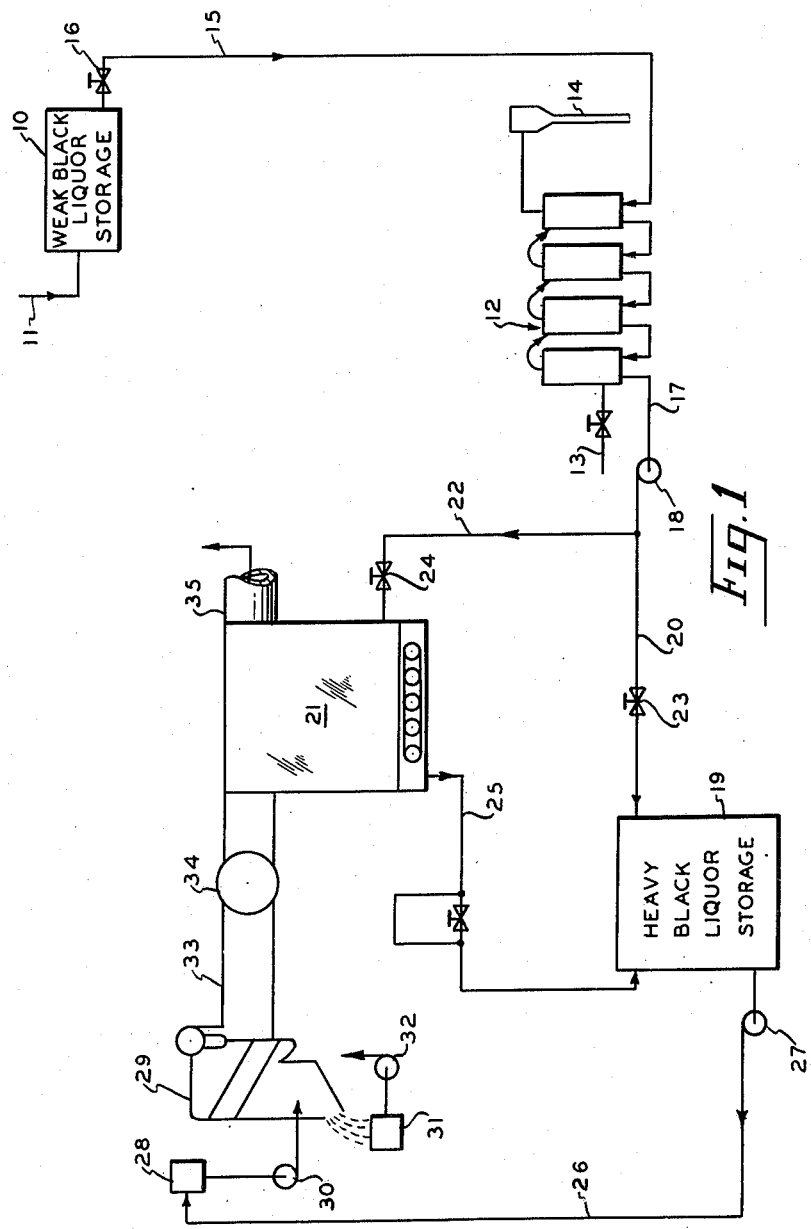
Fig. 1 is a diagrammatic view of a black liquor recovery system employing the principles of the invention.

Referring to the drawings, particularly to Fig. 1 thereof, the black liquor recovery system shown has a weak black liquor storage tank 10 receiving weak black liquor through the line 11. As will be understood, the weak black liquor is obtained in the sulfate pulp process from the pulp digesters after filtration therefrom of the digested wood chips. This weak black liquor contains valuable chemicals, including sodium sulfate, and considerable dissolved organic material. In the recovery system to be described, the black liquor is reduced to a concentration at which it will ignite and it is thereafter burned in a furnace to oxidize and volatilize the organic material and water and to reduce the sodium sulfate to sodium sulfide. The sodium sulfide is recovered from the furnace ash and, after purification, is reused in the digestion of further quantities of wood chips.

The first step of concentration of the weak black liquor is performed in a multiple effect evaporator 12 of conventional form including four effects, a steam supply line 13, and a condenser 14. Weak black liquor is conducted from the tank 10 to the evaporator 12 through a pipe 15 under control of a valve 16 and, after preliminary concentration, the black liquor issues from the evaporator into a pipe 17 and is moved by a pump 18 either to the heavy black liquor storage tank 19 through the pipe 20 or to the electrical precipitator 21 through the pipe 22. Valves 23 and 24 in the pipes 20 and 22 respectively control the distribution of black liquor between the tank 19 and the precipitator 21.

As will be explained hereinafter, the black liquor that is distributed to the precipitator 21 is fortified and concentrated therein to provide a very heavy black liquor that is exhausted to the storage tank 19 through the pipe 25. In the storage tank, the concentrated black liquor from the evaporator 12 and the very heavy black liquor from the precipitator 21 are mixed to provide black liquor that is suitable for furnace reduction.

Heavy black liquor from the storage tank 19 is transferred through a pipe 26 by a pump 27 to a furnace charging tank 28 from which it is introduced into a recovery furnace 29 by a charging device 30. The black liquor ignites and is burned in the furnace to produce an ash in which the sodium sulfate of the black liquor is substantially reduced to sodium sulfide. The ash is discharged from the furnace into a dissolving tank 31 in which it is dissolved in water and the solution from the tank is moved by a pump 32 to a point of further use.

Hot gases leave the furnace by way of the flue 33 and are impelled by a fan 34 through the precipitator 21. These gases contain in suspension as dust economically significant percentages of sodium sulfate and other valuable chemicals such as sodium carbonate. The dust is removed from the gas stream by the precipitator, as will be explained hereinafter, and the cleaned gas stream is disposed of through the duct 35.

Figure 2:
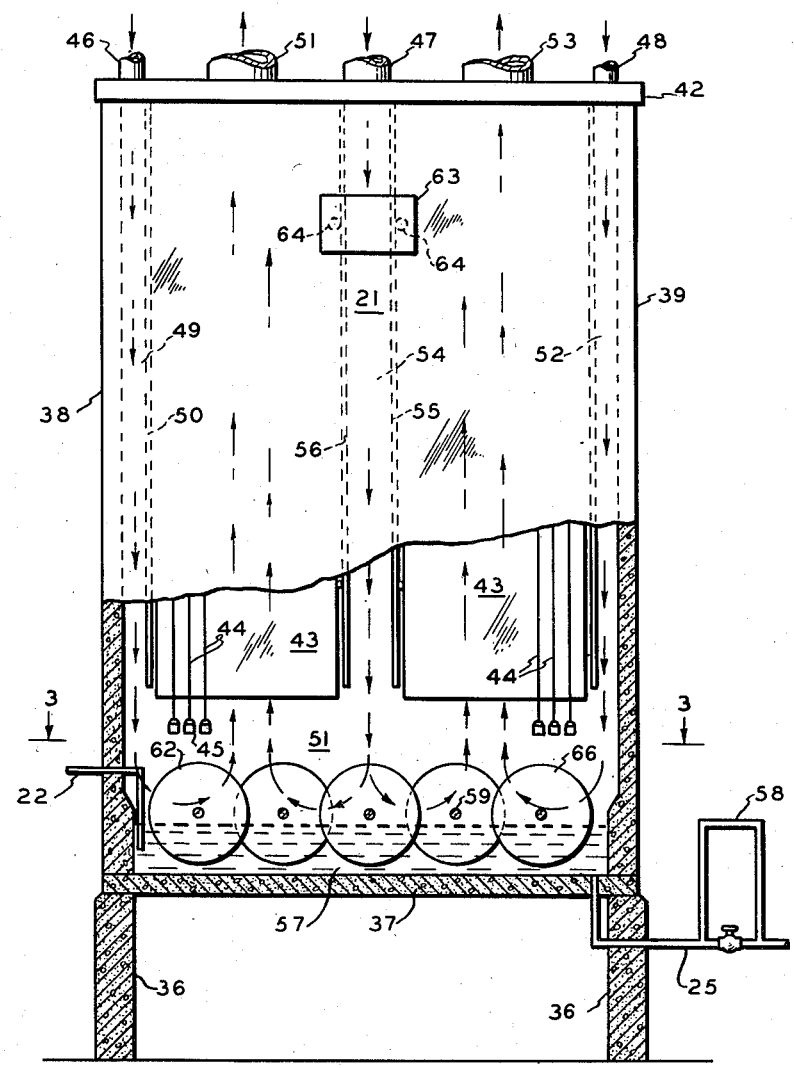
Fig. 2 is an elevational view of an electrical precipitator as used in the system of Fig. 1, parts being broken away to show interior construction.

Referring to Figs. 2 and 3, the electrical precipitator shown and generally designated by the numeral 21 is mounted on concrete piers 36. The precipitator has a concrete shell or casing including a bottom 37, sidewalls 38, 39, 40 and 41, and a top 42. Suspended in the casing are parallel plate electrodes 43 that function in the usual manner as collecting electrodes, and a plurality of complementary high tension electrodes in the form of fine wires 44 that are hung from insulated supports (not shown) in the usual way and are tensioned by weights 45 attached to the lower ends of the wires.

Gas to be cleaned enters the precipitator through the inlet ducts 46, 47 and 48. That portion of the gas that enters through the duct 46 flows downwardly through a conduit 49 defined between the shell wall 38 and a partition 50. The partition terminates at approximately the level of the bottoms of the electrode plates. Gas issues from the conduit 49 into a zone 51 beneath the electrodes, reverses direction as shown by the curved arrows, flows upwardly between the electrodes 43 and 44 in the left hand section of the precipitator and is exhausted from the precipitator through the outlet duct 51.

Similarly, gas that enters through the duct 48 flows down through a conduit 52, up through the right hand section of the precipitator and is exhausted through the outlet duct 53.

In like manner, gas that enters the precipitator through the duct 47 flows down through a conduit 54, provided between parallel partitions 55 and 56, and up through the left and right hand sections of the precipitator.

The bottom of the precipitator provides a sump in which is maintained a pool 57 of black liquor. As explained hereinbefore, weak black liquor is brought into the sump through the conduit 22 and fortified black liquor is withdrawn through the pipe 25. The latter has an inverted U-shaped portion 58 that maintains the black liquor pool 57 at a fixed level.

Extending transversely over the pool of black liquor is a plurality of spaced, parallel shafts 59 that are journalled in bearings in the precipitator shell walls 40 and 41. The shafts are rotated by a pulley and belt drive system 60 from a motor-driven shaft 61.

Each shaft carries a plurality of discs 62 that rotate with the shafts. These discs have their lower portions immersed in the pool 57 and their upper portions exposed to the atmosphere in the zone 51 that lies between the pool of liquor and the precipitator electrodes. The discs preferably are arranged in staggered overlapping relation as best seen in Fig. 3.

A conventional rapping device 63 having rapper bars 64 acting on the collecting plates 43 serves to vibrate the plates and to shake from them material that is deposited thereon.

In operation, hot gases from the recovery furnace are passed through the precipitator and, the electrodes being energized in the customary way, sodium sulfate containing ash carried by the gases is precipitated upon the electrodes 43. The rapper 63 is energized, preferably continuously, and the precipitated ash is shaken from the electrodes and falls into the pool 57 of black liquor in the sump. The ash is soluble in and dissolves in the black liquor.

The discs 62 are rotated continuously. They pick up films of solution from the pool and expose these films to the currents of hot gases flowing in the zone 51. Action of the hot gas currents effects evaporation of a part of the water from the solution and results in a concentration of the solution.

Thus it is seen that the strength of the black liquor in the sump is increased both by addition of precipitated ash to the pool and evaporation of water from the pool. The flow of black liquor into and out of the pool is regulated to provide a solution of the desired concentration at the outlet 25.

It will be observed that the discs 62 in rotating through the pool of black liquor effect agitation of the pool and facilitate solution of the precipitated ash in the black liquor.

Referring to Fig. 4, the electrical precipitator shown has a shell or housing including a sump 65 containing a pool of black liquor 66. Weak black liquor is admitted to the sump through a pipe 67 and fortified black liquor is discharged from the sump through a pipe 68 having an inverted U-shaped section 69 maintaining a constant level of liquor in the pool 66.

Hot gases from the recovery furnace are led into the sump 65 by an inlet duct 72. These gases flow through a zone 73 over the surface of the pool of black liquor in the sump and in contact with the unsubmerged portions of the discs 70. The gases issue from the sump into a duct 74 through which they are conducted to and through a precipitator compartment 75. The gases are exhausted from the apparatus through an outlet duct 76.

In the precipitator compartment are three horizontal gas flow precipitator sections 76, 77 and 78 each including the usual collector plates 79 and complementary discharge electrodes 80. Conventional rapping devices 81, 82 and 83 are provided to vibrate the plates 79 and thus to shake from them precipitated ash.

Ash removed from the electrodes falls into hoppers 84 beneath the precipitator sections. The hoppers discharge into the sump 65 through a star valve 85 operated by a motor 86. The star valve permits substantially continuous transferral of ash from the hoppers to the sump while preventing flow of gas directly from the sump through the hoppers to the precipitator sections.

Operation of the apparatus of Fig. 4 should be apparent from the foregoing description. In brief, however, hot recovery furnace gases bearing suspended ash are caused to flow through the sump chamber and thereafter through the precipitation chamber. Black liquor to be fortified is circulated through the sump. With the discs 70 rotating, the hot furnace gases evaporate a substantial portion of the water from the black liquor, evaporation occurring both at the free surface of the liquor pool and from the extended liquor films formed on the unsubmerged surfaces of the discs. The furnace gases, which are cooled somewhat in their passage through the sump chamber, are relieved in large part of their burden of suspended ash during their passage through the precipitator chamber and are discharged therefrom in a substantially clean condition.

Ash that is precipitated on the precipitator electrodes is rapped therefrom, caught in the hoppers 84 and dumped by the star valve 85 into the pool 66 of black liquor in which the ash dissolves to further increase the solids content of the liquor. Fortified black liquor is withdrawn from the sump through the pipe 68.

Various changes in the process and in the apparatus shown and described by way of illustration will occur to those skilled in the art without departing from the invention. For example, the direction of flow of the hot gases in either of the precipitators shown in Figs. 2 and 3 or in Fig. 4 may be reversed while retaining many of the advantages of the invention; that is, the hot furnace gases may first be subjected to electrical precipitation conditions and thereafter may be utilized for the evaporation of water from the weak black liquor. Liquid soluble dusts other than ash from black liquor recovery furnaces may also be collected in solution form. In the apparatus of Fig. 4, the star valve 85 may be omitted to provide an open passage from the hoppers 84 to the sump chamber if some means such as a fan is placed in the duct 74 to raise the pressure in the precipitator chamber above that in the sump chamber whereby short circuiting of gas from the sump chamber through the hoppers 84 is prevented.

I claim:

1. An electrical precipitator comprising a casing, complementary collecting and high tension electrodes in said casing, sump means adapted to contain a pool of liquid positioned beneath said complementary electrodes, liquid inlet and outlet means communicating with said sump means, means conducting material removed from said electrodes into said sump means, a member providing an extended evaporating surface in said casing above the normal level of liquid in said sump means, means for forming on the evaporating surface of said member a film of liquid from said pool, and means directing a stream of hot gas to be cleaned into contact with a film of liquid on the evaporating surface of said member and between said complementary electrodes.

2. An electrical precipitator comprising a casing, complementary collecting and high tension electrodes in said casing, sump means adapted to contain a pool of liquid positioned beneath said complementary electrodes, liquid inlet and outlet means communicating with said sump means, means conducting material removed from said electrodes into said sump means, a member providing an extended evaporating surface, means for moving said member to alternately immerse surface elements thereof in a pool of liquid in said sump means and expose said surface elements to the atmosphere superjacent to the pool, and means directing a stream of hot gases to be cleaned into contact with said member above the surface of the pool of liquid and between said complementary electrodes.

3. An electrical precipitator comprising a casing, vertically extending complementary collecting and discharge electrodes in said casing, sump means in said casing subjacent to said complementary electrodes, liquid inlet and outlet means communicating with said sump means, a plurality of vertically disposed disc members rotatably mounted in said sump means, means for rotating said disc members to bring successive surface elements thereof into and out of a pool of liquid in said sump means, and means directing a stream of hot gases to be cleaned first into contact with said disc members above the surface of the pool of liquid in said sump means and thereafter between said complementary electrodes.

4. An electrical precipitator comprising a casing, sump chamber means in the lower portion of said casing, precipitator chamber means including complementary vertically extending collector and discharge electrodes in the upper portion of said casing, conduit means including a star valve connecting the bottom of said precipitator chamber means with the top of said sump chamber means, liquid inlet and outlet means communicating with said sump chamber means, a plurality of vertically disposed disc members rotatably mounted in said sump chamber means, means for rotating said disc members to bring successive surface elements thereof into and out of a pool of liquid in said sump chamber means, means directing a stream of hot gases to be cleaned first into contact with said disc members above the surface of the pool of liquid in said sump chamber means and thereafter between the complementary electrodes in said precipitator chamber means.

5. A method of recovering liquid-soluble dusts from a stream of hot gases in which said dust is suspended comprising passing said stream of gases through a confined zone and electrically precipitating dust from said stream in said zone, establishing a pool of liquid solvent for said dust, transferring precipitated dust from said zone to said pool wherein said dust is dissolved, passing said stream of hot gases across the surface of said pool, and exposing portions of said pool of liquid in extended surface film form to the stream of hot gases passing across the surface of said pool, whereby the concentration of dust in said pool is increased both by addition of dust thereto and evaporation of liquid therefrom.

CHARLES E. BEAVER.

References Cited in the file of this patent

UNITED STATES PATENTS

| Number | Name | Date |
| --- | --- | --- |
| 1,145,903 | Lehrack et al. | July 13, 1915 |
| 2,087,077 | Wadsworth et al. | July 13, 1937 |
| 2,171,617 | Wintermute | Sept. 5, 1939 |
| 2,172,304 | Wintermute | Sept. 5, 1939 |
| 2,240,376 | Nyquist | Apr. 29, 1941 |